United States Patent
Roudeski

(10) Patent No.: US 9,016,896 B1
(45) Date of Patent: Apr. 28, 2015

(54) OBSTRUCTION LIGHTING SYSTEM

(75) Inventor: Charles A. Roudeski, Springfield, OH (US)

(73) Assignee: Hughey & Phillips, LLC, Urbana, OH (US)

(*) Notice: Subject to any disclaimer, the term of this patent is extended or adjusted under 35 U.S.C. 154(b) by 269 days.

(21) Appl. No.: 13/403,232

(22) Filed: Feb. 23, 2012

Related U.S. Application Data

(60) Provisional application No. 61/446,022, filed on Feb. 23, 2011.

(51) Int. Cl.
*F21V 1/00* (2006.01)
*F21V 7/04* (2006.01)

(52) U.S. Cl.
CPC ........................................ *F21V 7/04* (2013.01)

(58) Field of Classification Search
None
See application file for complete search history.

(56) References Cited

U.S. PATENT DOCUMENTS

| | | | |
|---|---|---|---|
| 4,498,004 A | 2/1985 | Adolfsson et al. | |
| 4,609,306 A | 9/1986 | Loire | |
| 5,155,666 A | 10/1992 | Radford et al. | |
| 5,608,290 A | 3/1997 | Hutchisson et al. | |
| 5,642,933 A | 7/1997 | Hitora | |
| 5,838,247 A | 11/1998 | Bladowski | |
| 5,929,788 A | 7/1999 | Vukosic | |
| 6,022,124 A | 2/2000 | Bourn et al. | |
| 6,070,994 A | 6/2000 | Sebek et al. | |
| 6,183,100 B1 | 2/2001 | Suckow et al. | |
| 6,364,506 B1 | 4/2002 | Gallo | |
| 6,379,026 B1 | 4/2002 | Petrick | |
| 6,464,373 B1 | 10/2002 | Petrick | |
| 6,525,668 B1 | 2/2003 | Petrick | |
| 6,561,689 B1 | 5/2003 | Kidd et al. | |
| 6,601,970 B2 | 8/2003 | Ueda et al. | |

(Continued)

FOREIGN PATENT DOCUMENTS

CN 201636748 U 11/2010
EP 1231109 A1 8/2002

(Continued)

OTHER PUBLICATIONS

Promotional Sheet, Excelitas Technologies "Lighting Solutions for Safety and Security". 4 pages.

(Continued)

*Primary Examiner* — Britt D Hanley
(74) *Attorney, Agent, or Firm* — Michael A. Forhan; James R. Eley; Eley Law Firm Co., LPA

(57) ABSTRACT

An obstruction lighting system includes a disc having a generally planar surface. A plurality of light emitting diodes are mounted to the planar surface of the disc, a central light emitting axis of the light emitting diodes being oriented generally perpendicularly away from the planar surface. A reflector is coupled to the disc, the reflector having an outer surface in the shape of a rotated conic section, the reflector further including a projecting portion. The outer surface of the reflector has an optical axis generally perpendicular to the central light emitting axis of the light emitting diodes. Furthermore, the projecting portion of the reflector blocks light emissions from the light emitting diodes in an upwardly direction from the obstruction lighting system. The disc and a lens retainer may be configured to block light emitted by the light emitting diodes from traveling in a downwardly direction from the obstruction lighting system.

22 Claims, 9 Drawing Sheets

(56) References Cited

U.S. PATENT DOCUMENTS

| | | |
|---|---|---|
| 6,637,921 B2 | 10/2003 | Coushaine |
| 6,679,618 B1 | 1/2004 | Suckow et al. |
| 6,705,745 B1 | 3/2004 | Pederson |
| 6,793,372 B2 | 9/2004 | Wehner et al. |
| 6,932,496 B2 | 8/2005 | Rizkin et al. |
| 6,948,830 B1 | 9/2005 | Petrick |
| 6,991,351 B1 | 1/2006 | Petrick |
| 7,040,782 B2 | 5/2006 | Mayer |
| 7,079,041 B2 | 7/2006 | Fredericks et al. |
| 7,160,004 B2 | 1/2007 | Peck |
| 7,163,322 B2 | 1/2007 | Tatewaki et al. |
| 7,236,105 B2 | 6/2007 | Brenner et al. |
| 7,237,929 B2 | 7/2007 | Stahl |
| 7,497,593 B2 | 3/2009 | Wang |
| 7,568,821 B2 | 8/2009 | Peck et al. |
| 7,578,600 B2 | 8/2009 | Czajkowski |
| 7,604,384 B2 | 10/2009 | Peck |
| 7,658,513 B2 | 2/2010 | Peck |
| 7,758,210 B2 | 7/2010 | Peck |
| 7,791,497 B2 | 9/2010 | Clerk |
| 7,832,908 B2 | 11/2010 | Peck et al. |
| 8,033,683 B2 | 10/2011 | Fields |
| 8,096,677 B2 | 1/2012 | Fields et al. |
| 2001/0015899 A1 | 8/2001 | Kondo et al. |
| 2004/0004836 A1 | 1/2004 | Dubuc |
| 2004/0057234 A1 | 3/2004 | Mohacsi |
| 2004/0057244 A1 | 3/2004 | Amano |
| 2004/0145910 A1 | 7/2004 | Lisowski |
| 2004/0196646 A1 | 10/2004 | Machi et al. |
| 2005/0094393 A1 | 5/2005 | Czajkowski |
| 2005/0157490 A1 | 7/2005 | Klose |
| 2006/0007012 A1 | 1/2006 | Machi et al. |
| 2006/0012990 A1 | 1/2006 | Walser et al. |
| 2006/0291209 A1 | 12/2006 | Booth et al. |
| 2008/0192480 A1 | 8/2008 | Rizkin et al. |
| 2009/0219715 A1 | 9/2009 | Peck et al. |
| 2010/0027281 A1 | 2/2010 | Waters et al. |
| 2010/0084979 A1 | 4/2010 | Burton et al. |
| 2010/0244748 A1 | 9/2010 | Haab et al. |
| 2010/0259929 A1 | 10/2010 | Henri et al. |
| 2011/0018439 A1 | 1/2011 | Fabbri et al. |
| 2011/0051421 A1 | 3/2011 | Chew |
| 2011/0058370 A1 | 3/2011 | Datz et al. |
| 2011/0121734 A1 | 5/2011 | Pape |
| 2011/0194283 A1 | 8/2011 | Roer |
| 2011/0235322 A1 | 9/2011 | Fields et al. |
| 2011/0305014 A1 | 12/2011 | Peck |
| 2012/0300449 A1 | 11/2012 | Fields |

FOREIGN PATENT DOCUMENTS

| | | |
|---|---|---|
| EP | 1698823 A2 | 9/2006 |
| EP | 1698823 B1 | 4/2010 |
| JP | 2001243821 A | 9/2001 |
| WO | 2009084049 A1 | 7/2009 |
| WO | 2009133326 A2 | 11/2009 |

OTHER PUBLICATIONS

Data Sheet, Orga Model AOL 1000SA High Intensity Aeronautical Obstruction Light.

European Search Report, Application EP12160211, mailed Aug. 7, 2013.

Dialight Corp., Product datasheet for D164 Series LED Red Beacon, printed Jan. 21, 2011.

OBSTRUCTION LIGHTING SYSTEM

This application claims priority to U.S. provisional application 61/446,022, filed Feb. 23, 2011, the contents of which are hereby incorporated by reference.

FIELD

The present invention relates generally to lighting systems, in particular to obstruction lighting systems.

BACKGROUND

The Federal Aviation Administration (FAA) requires that obstructions to aircraft navigation, such as towers, cables and tall buildings be fitted with visibly perceivable elements to render these structures highly visible to approaching aircraft. FAA Advisory Circular 150/5345-43 forms a specification of technical requirements for these lights in the United States.

Within Advisory Circular 150/5345-43 there exists a requirement for a low-intensity, steady-burn red light system, designated the "L-810," to be placed in accordance with a set plan at levels on all obstructions that are potential hazards to air navigation. The L-810 lighting system generally incorporates a light source and a lensed dome that directs red light into a 360 azimuth around the obstruction and within a minimum vertical beam spread of 10 degrees about a plane anywhere from 4 to 20 degrees above the horizontal. The minimum intensity of the L-810 light is 32.5 candela.

A conventional L-810 obstruction light employs an incandescent lamp. The lensed dome comprises a red filter glass structure having a molded Fresnel outer portion and a lenticular array inner portion. Substantially white light produced by a filament of the incandescent lamp is focused vertically into the 10-degree zone by the Fresnel portion and is dispersed uniformly into the 360-degree zone by the lenticular array portion.

A weak link in conventional L-810 lighting systems is the incandescent lamp, which has a relatively limited service life. Consequently, the incandescent lamp requires frequent replacement. Since L-810 obstruction lights are normally mounted atop tall structures, replacing these lamps can be inconvenient, time-consuming, expensive and even dangerous.

Advisory Circular 150/5345-43 also requires that obstruction lights be monitored for proper operation. Although such monitoring can be accomplished manually by regularly visually observing the obstruction lights, manual monitoring can be laborious and inconvenient, particularly when an obstruction or a network of obstructions, such as a wind turbine electric power generation field, utilizes a number of obstruction lights. Consequently, automatic remote monitoring systems are often utilized to monitor the obstruction lights and sound an alarm to maintenance personnel in the event of a failure. Light sensors, such as photocells, can be used to monitor light output. However, light sensors suffer from several drawbacks, principally the complexity of the circuitry required to sound an alarm to maintenance personnel who are located at a distance from a failed obstruction light. Thus, remote monitoring of the light by monitoring the power consumption characteristics of the obstruction light is preferred. In such arrangements the power consumption of an obstruction light is monitored, the power consumption falling to a lower level in the event of a lamp failure. However, remote monitoring of the obstruction light in this manner is problematic due to the difficulty in accurately monitoring the power consumption characteristics of an obstruction light having a much lower current (i.e., light emitting diode vs. incandescent light sources) or comparatively high quiescent currents from the light emitting diode ballast and/or system wiring capacitance.

Another drawback of conventional obstruction lights is light pollution. Light pollution as it relates to obstruction lighting may be generally defined as the emission of light outside the band specified by Advisory Circular 150/5345-43. Light pollution can be an annoyance, particularly when the obstruction light is proximate to residential areas. In some cases light pollution can cause problems such as sleep deprivation or the blocking of an evening view.

There exists a need for an obstruction lighting system that meets the requirements of Advisory Circular 150/5345-43 and uses light sources having a higher reliability than is available with incandescent lamps. There is a further need for an obstruction lighting system that is easily configured for remote fault monitoring and that effectively confines light emissions to desired lighting patterns.

SUMMARY

An obstruction lighting system utilizing light emitting diodes (LEDs) as a light source is disclosed according to an embodiment of the present invention. The obstruction lighting system meets the requirements of FAA Advisory Circular 150/5345-43 for L-810-type obstruction lighting, is easily configured for remote monitoring and effectively confines light emissions to desired lighting patterns.

In one aspect of the present invention an obstruction lighting system is disclosed. The system includes a disc having a generally planar surface. A plurality of light emitting diodes are mounted to the planar surface of the disc, a central light emitting axis of the light emitting diodes being oriented generally perpendicularly away from the planar surface. A reflector is coupled to the disc, the reflector having an outer surface in the shape of a rotated conic section, the reflector further including a projecting portion. The outer surface of the reflector has an optical axis generally perpendicular to the central light emitting axis of the light emitting diodes. Furthermore, the projecting portion of the reflector blocks light emissions from the light emitting diodes in an upwardly direction from the obstruction lighting system. Similarly, a printed wiring board and a lens retainer block light from traveling in a downwardly direction from the obstruction lighting system.

In another aspect of the present invention an obstruction lighting system having an auxiliary lighting assembly is disclosed. The auxiliary lighting assembly includes at least one auxiliary light emitting diode which may be configured to emit light having the same color as other light emitting diodes of the obstruction light, or another color such as infrared light, in an upwardly direction. The auxiliary lighting assembly also includes an auxiliary printed wiring board, the auxiliary light emitting diode being mounted to the auxiliary printed wiring board. The auxiliary printed wiring board comprises a first surface and an opposing second surface, the first and second surfaces having thermally conductive elements, the auxiliary printed wiring board further including at least one thermal via extending between the first and second surfaces and thermally coupled to the thermally conductive elements of the first and second surfaces.

BRIEF DESCRIPTION OF THE DRAWINGS

Further features of the inventive embodiments will become apparent to those skilled in the art to which the embodiments relate from reading the specification and claims with reference to the accompanying drawings, in which:

In the discussion that follows, like reference numerals are used to refer to like structures and elements in the various figures.

DETAILED DESCRIPTION

Figure 1:
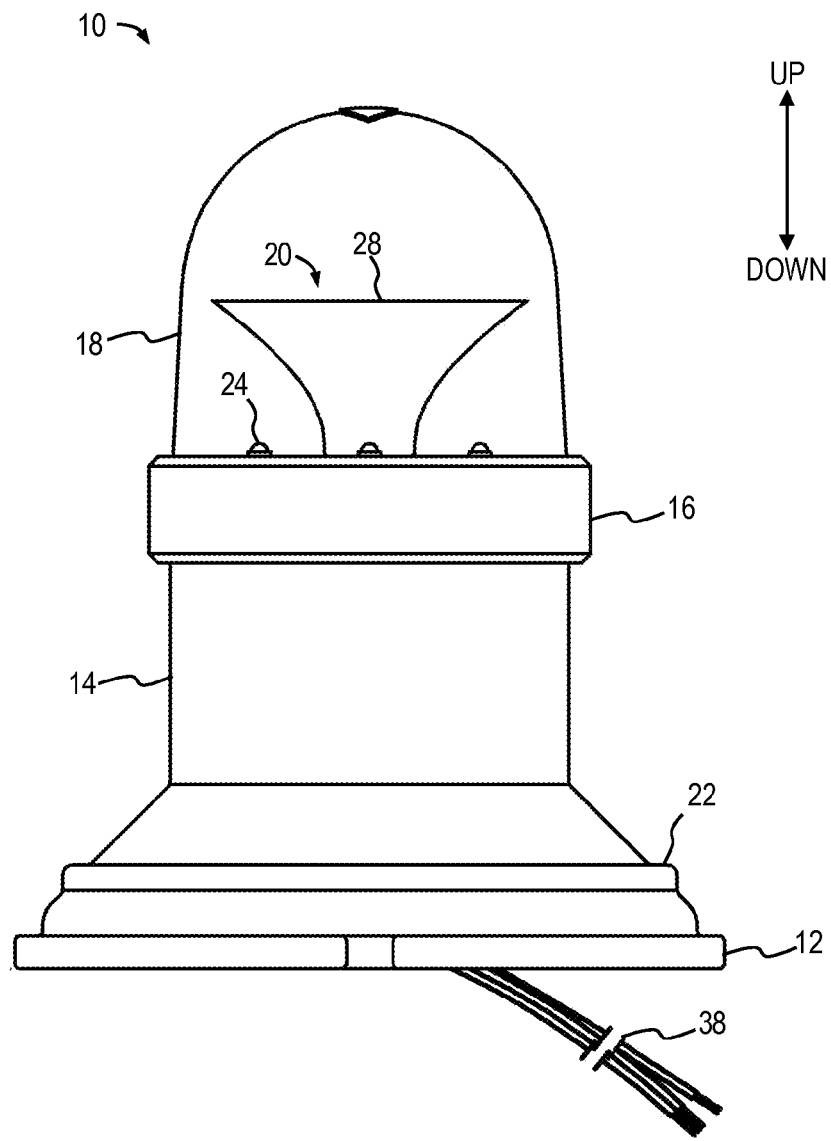
FIG. 1 is an elevational view of an obstruction light according to an embodiment of the present invention.
Figure 2:
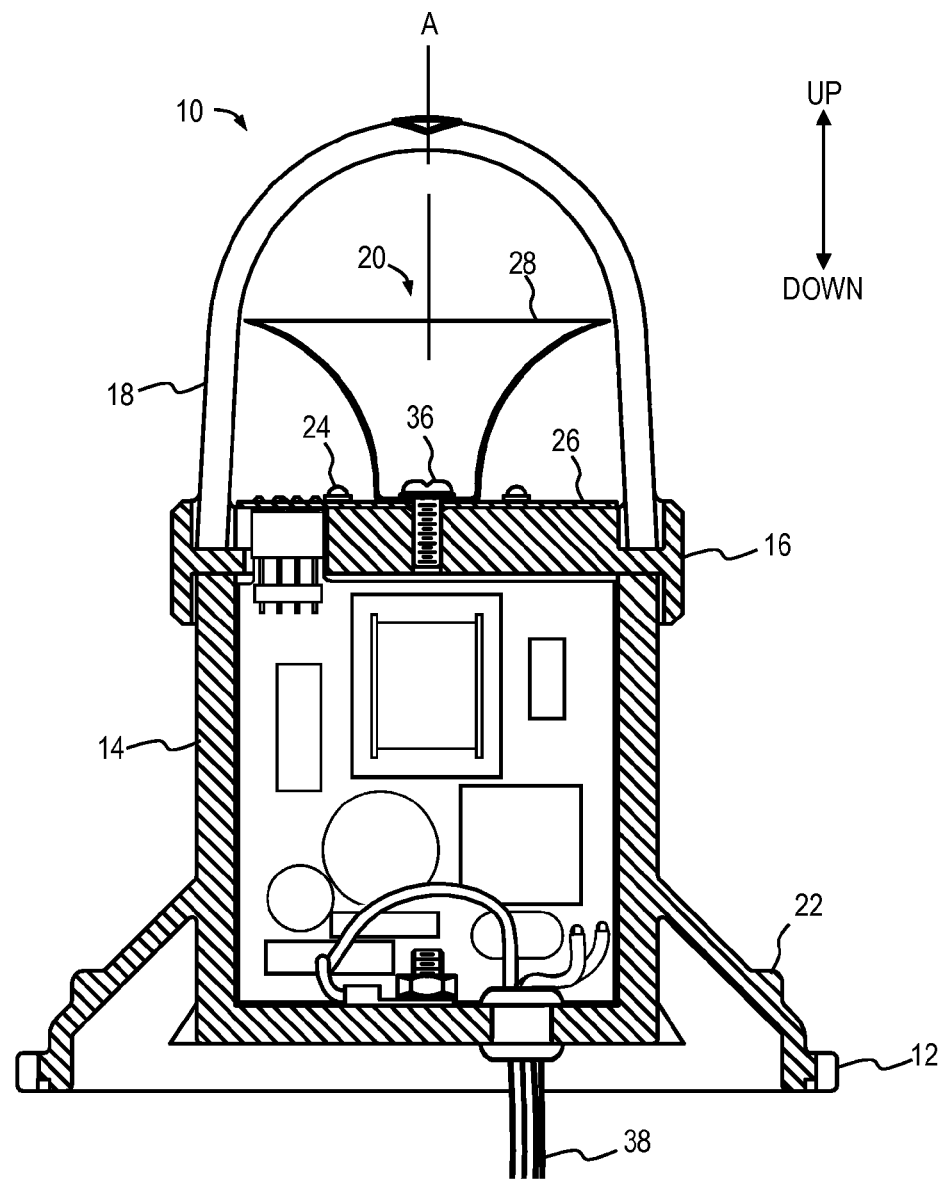
FIG. 2 is a view in section of the obstruction light of FIG. 1.
Figure 3:
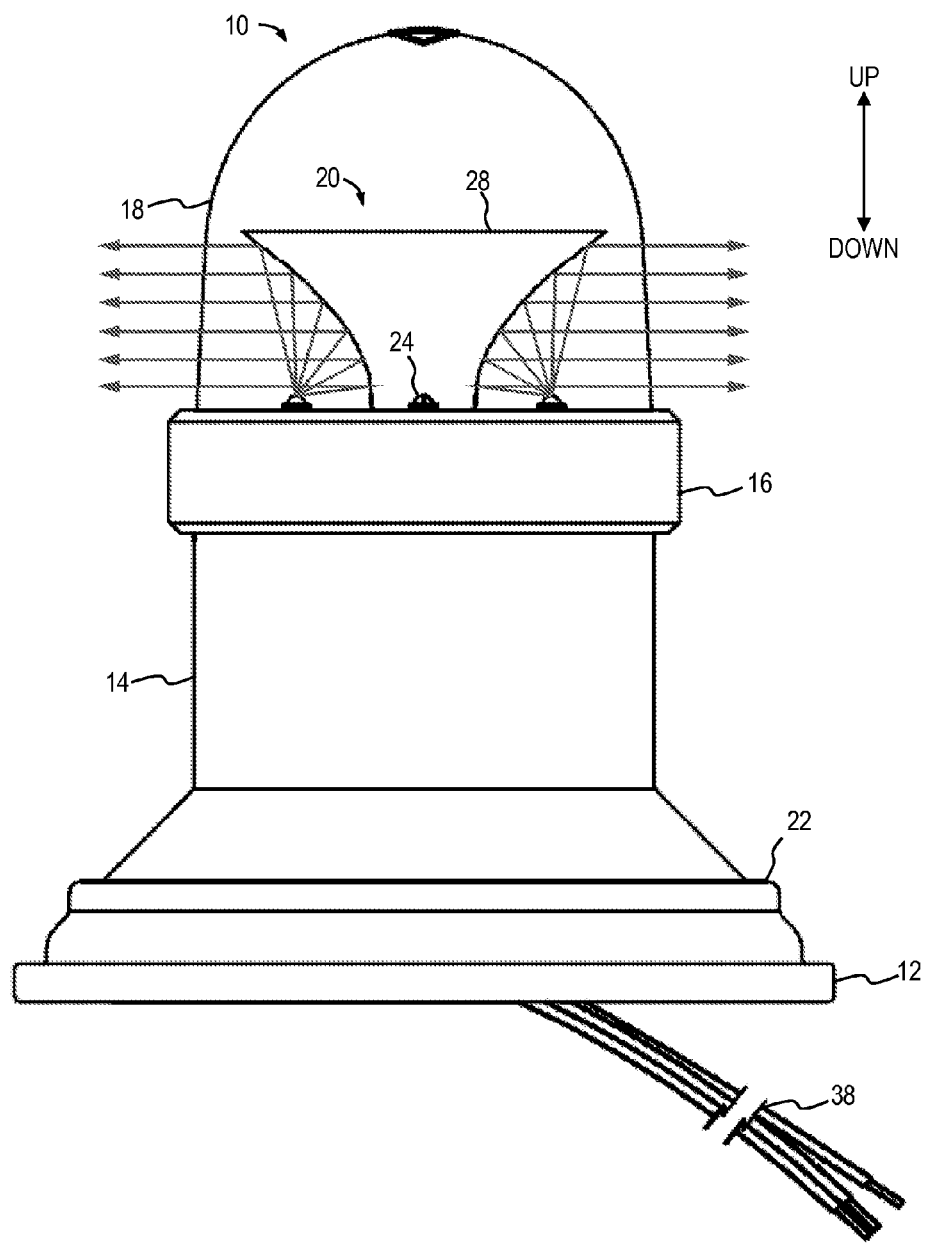
FIG. 3 is an elevational view showing the general lighting pattern of the obstruction light of FIG. 1.
Figure 4:
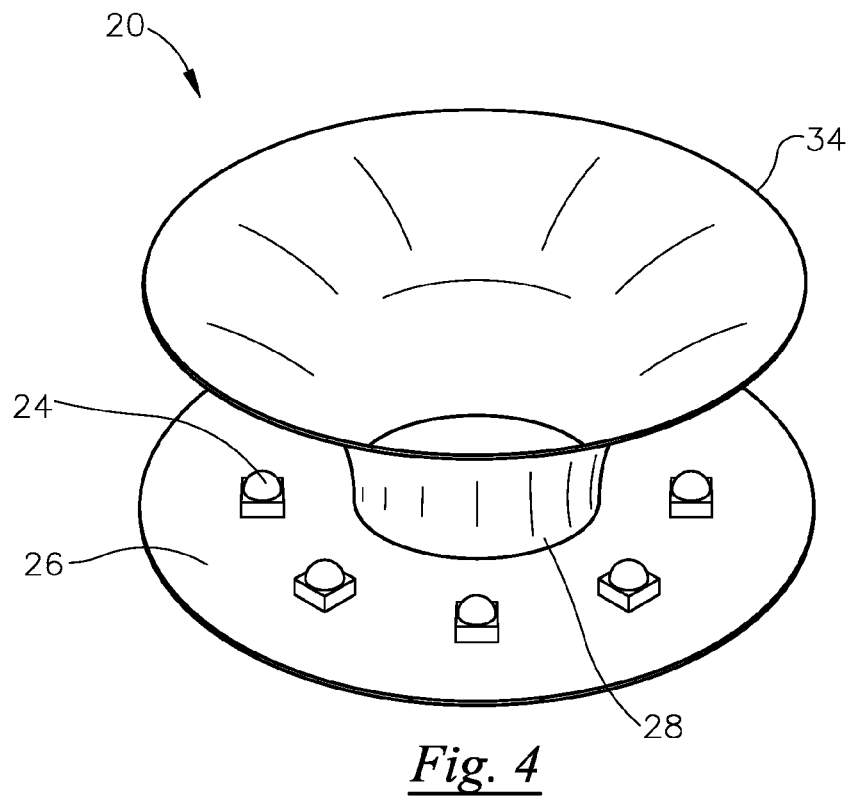
FIG. 4 is a perspective view of a lamp assembly of the obstruction light of FIG. 1.
Figure 5:
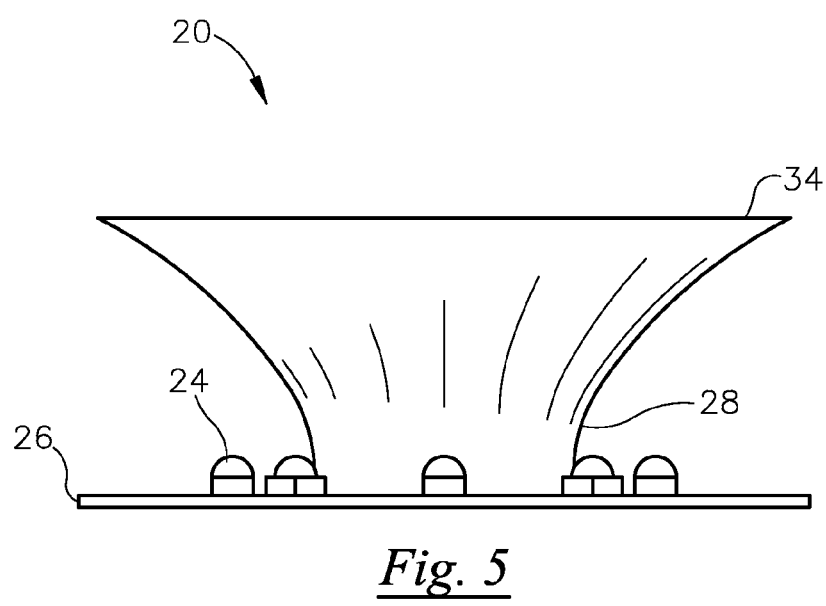
FIG. 5 is a side elevational view of the lamp assembly of FIG. 4.

The general arrangement of an obstruction light 10 is shown in FIGS. 1 through 3 according to an embodiment of the present invention. Obstruction light 10 includes a base 12, a housing 14, a lens retainer 16, a lens 18, and a lamp assembly 20.

Base 12 is sized and shaped to be coupled atop an obstruction light mount (not shown). Base 12 is preferably generally circular in shape, but may be any geometric shape within the scope of the invention. Typically, a lip 22 of base 12 is sized and shaped to receive a clamping mechanism of the light mount. However, base 12 may incorporate any suitable structures and devices to selectably couple obstruction light 10 to an obstruction light mount including, without limitation, a threaded receptacle, connectors, screws and fasteners. Base 12 may be made from any material suitable for use with obstruction light 10 and the expected environment including, without limitation, metal, plastic and composites. In addition, base 12 may be formed in any conventional manner including, without limitation, casting, machining, forming, molding and stamping. Furthermore, base 12 may be finished in any conventional manner, such as painting, coating, plating and powder coating, or may be left unfinished.

Housing 14 extends away from base 12 at a first end, and is sized and shaped to receive lens retainer 16 and lens 18 at an opposing second end. Housing 14 is preferably cylindrical in shape, but may be any geometric shape within the scope of the invention. Housing 14 may be made from any material suitable for use with obstruction light 10 and the expected environment including, without limitation, metal, plastic and composites. In addition, housing 14 may be formed in any conventional manner including, without limitation, casting, machining, forming, molding and stamping. Furthermore, housing 14 may be finished in any conventional manner, such as painting, coating, plating and powder coating, or may be left unfinished.

Lens retainer 16 is detachably coupled to at least one of housing 14 and lens 18 and preferably provides selectable access to an interior portion of the housing, as well as selectable access to lamp assembly 20. Lens retainer 16 is preferably circular in shape, but may be any geometric shape within the scope of the invention to conform to the shape of housing 14 and/or lens 18. Lens retainer 16 may be made from any material suitable for use with obstruction light 10 and the expected environment including, without limitation, metal, plastic and composites. In addition, lens retainer 16 may be formed in any conventional manner including, without limitation, casting, machining, forming, molding and stamping. Furthermore, lens retainer 16 may be finished in any conventional manner, such as painting, coating, plating and powder coating, or may be left unfinished.

Lens 18 is sized and shaped to receive and contain lamp assembly 20. Lens 18 is typically generally dome-shaped, but may be any suitable geometric shape within the scope of the invention. Lens 18 may be made from any suitable material, such as glass or plastic. Lens 18 is preferably "aviation red" in color to conform to Advisory Circular 150/5345-43, but in practice may be any color or even generally transparent within the scope of the present invention. Lens 18 also preferably conforms to the requirements in military specification MIL-DTL-7989 and is preferably resistant to checking, crazing, or color changes caused by ultraviolet radiation or ozone gas exposure.

With additional reference to FIGS. 4 through 7, lamp assembly 20 comprises a plurality of LEDs 24 mounted to a disc having a generally planar surface, such as a printed wiring board 26, light emissions from the LEDs being directed at a reflector 28. LEDs 24 are preferably arranged in a ring about reflector 28 with a central light emitting axis 30 of the LEDs being oriented generally perpendicularly away from the planar surface of printed wiring board 26 and located at a focal distance $D_1$ from the reflector. LEDs 24 are preferably positioned relative to reflector 28 such that central light-emitting axis 30 of the LEDs is angled at a predetermined angle $\theta_1$ relative to an optical axis 32 of the reflector. Optical axis 32 is preferably generally horizontal, or about 0 degrees. In some embodiments of the present invention the about 0 degrees has a tolerance of plus or minus 30 degrees. In a preferred embodiment, central lighting axis 30 is oriented generally perpendicularly to optical axis 32. Stated another way, $\theta_1$ has a value of about 90 degrees. In some embodiments of the present invention the about 90 degrees of $\theta_1$ has a tolerance of plus or minus 30 degrees.

LEDs 24 may be any type of LED suitable for use with obstruction light 10. In some embodiments LEDs 24 may be surface-mounted to printed wiring board 26. LEDs 24 are preferably configured to emit red light, but the light emissions may be any desired color or combination of colors within the scope of the present invention.

Figure 6:
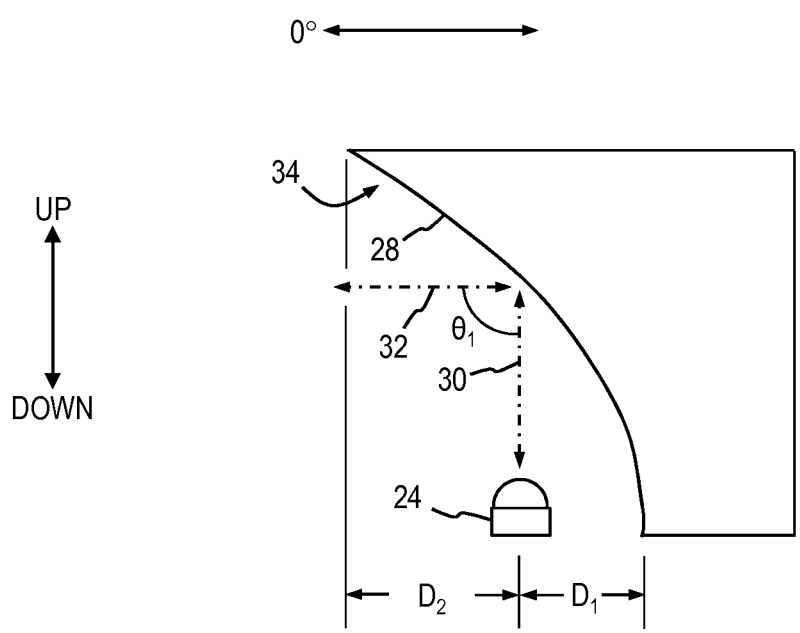
FIG. 6 is a schematic diagram showing details of the optical characteristics of the lamp assembly of FIG. 4.

Reflector 28 may be a rotated conic section having an outer surface in the shape of the rotated conic section. An interior portion of reflector 28 may be generally solid with a mounting hole therethrough, or may be generally hollow with an opposing inner surface that is likewise in the shape of the rotated conic section. In one embodiment of the present invention reflector 28 is in the shape of a rotated parabolic section of a suitable focal length. In some embodiments of the present invention, a reflector 28 having a rotated developed-shape conic section such as shown in FIG. 6 may be utilized rather than a simple parabola. The developed-shape cross section of reflector 28 includes a projecting portion 34. Projecting portion 34 preferably extends for a predetermined distance $D_2$ from the central light emitting axis 30 of LED 24, sufficient to substantially block undesired light emissions from the LEDs in an upwardly direction from obstruction light 10, thereby limiting light pollution generated by the obstruction light in the upward direction from obstruction light 10. Similarly, as can be seen in FIG. 2, distal ends of printed wiring board 26 and lens retainer 16 are both configured to extend a greater distance from a central axis "A" of the obstruction light than the spacing of LEDs 24 from the central axis. As a result, printed wiring board 26 and lens retainer 16 block light emitted by LEDs 24 from traveling in a downwardly direction from obstruction light 10.

Reflector 28 may be made from any suitable materials. Non-limiting examples include highly-polished metal, a coated (i.e., "metalized") metal or non-metal substrate, and a reflective film applied to a metal or non-metal substrate.

Printed wiring board 26 and reflector 28 may be coupled together to lens retainer 16 by a fastener 36 (FIG. 2), heat generated by LEDs 24 being transferred to the lens retainer by thermal conduction. In some embodiments housing 14 is thermally coupled to lens retainer 16, the housing thus further acting as a heat sink for LEDs 24. Reflector 28 and printed wiring board 26 are preferably detachably secured together through closely-toleranced openings in the printed wiring board and the reflector about central axis "A," ensuring that the reflector optically aligns with the LEDs 24. LEDs 24 are preferably positioned radially about central axis "A" so that the optical/thermal experience is the same for all LEDs.

Electrical power is supplied to obstruction light 10 with wiring 38 (FIGS. 1-3).

Figure 7:
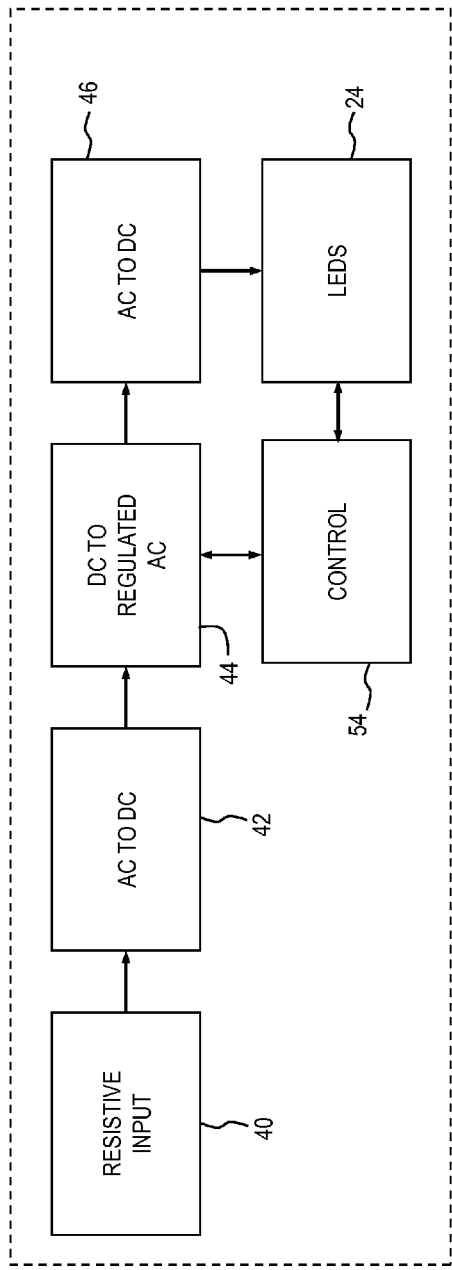
FIG. 7 is a schematic block diagram of the electrical circuit of an obstruction light supplied by an AC power source according to an embodiment of the present invention.

A schematic block diagram of a power supply for an obstruction light 10 configured to operate from AC mains power is shown in FIG. 7 according to an embodiment of the present invention. In this embodiment obstruction light 10 includes an electrical input 40, a first AC-to-DC converter 42, a DC-to-regulated AC converter 44, a second AC-to-DC converter 46 and LEDs 24.

Electrical input 40 receives AC electrical power 48 from a remote source 50 (FIG. 11), often located a distance from obstruction light 10. For example, remote source 50 may be located at the base of a tower or a wind turbine. Electrical power 48 may range from about 95-277 VAC, though the voltage may be more or less within the scope of the invention. Preferably, electrical input 40 presents a substantially resistive load to remote source 50.

First AC-to-DC converter 42 converts AC electrical power 48 to an unregulated DC voltage that is proportional to the AC electrical power. DC-to-regulated AC converter 44 receives the unregulated DC voltage from first AC-to-DC converter 42 and converts the variable DC voltage to a predetermined regulated AC voltage. Second AC-to-DC converter 46 receives the regulated AC electrical power from regulated DC-to-AC converter 44 and converts the regulated AC electrical power to a corresponding DC output voltage/current, which is supplied to LEDs 24.

Figure 8:
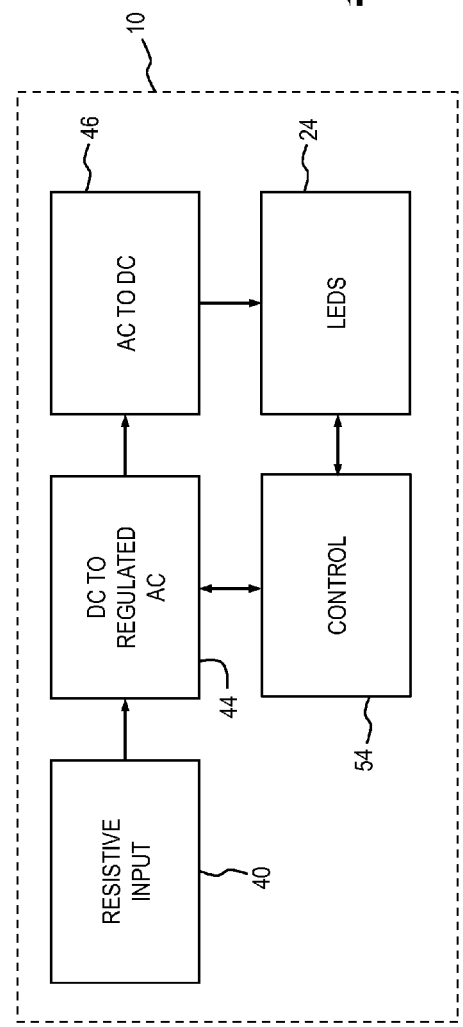
FIG. 8 is a schematic block diagram of the electrical circuit of an obstruction light supplied by a DC power source according to an embodiment of the present invention.

A schematic block diagram of a power supply for an obstruction light 10 configured to operate from DC electrical power 52 is shown in FIG. 8 according to an embodiment of the present invention. DC electrical power 52 may range from about 9-48 VDC, though the voltage may be more or less within the scope of the invention. In this embodiment obstruction light 10 includes an electrical input 40, a DC-to-regulated AC converter 44, an AC-to-DC converter 46 and LEDs 24. These elements are described above and thus will not be reiterated here.

With reference to FIGS. 7 and 8, in some embodiments obstruction light 10 may include a control 54 to perform various housekeeping tasks such as, but not limited to, flashing LEDs 24 at a predetermined flash rate, and autonomous fault-detection and correction.

Figure 9:
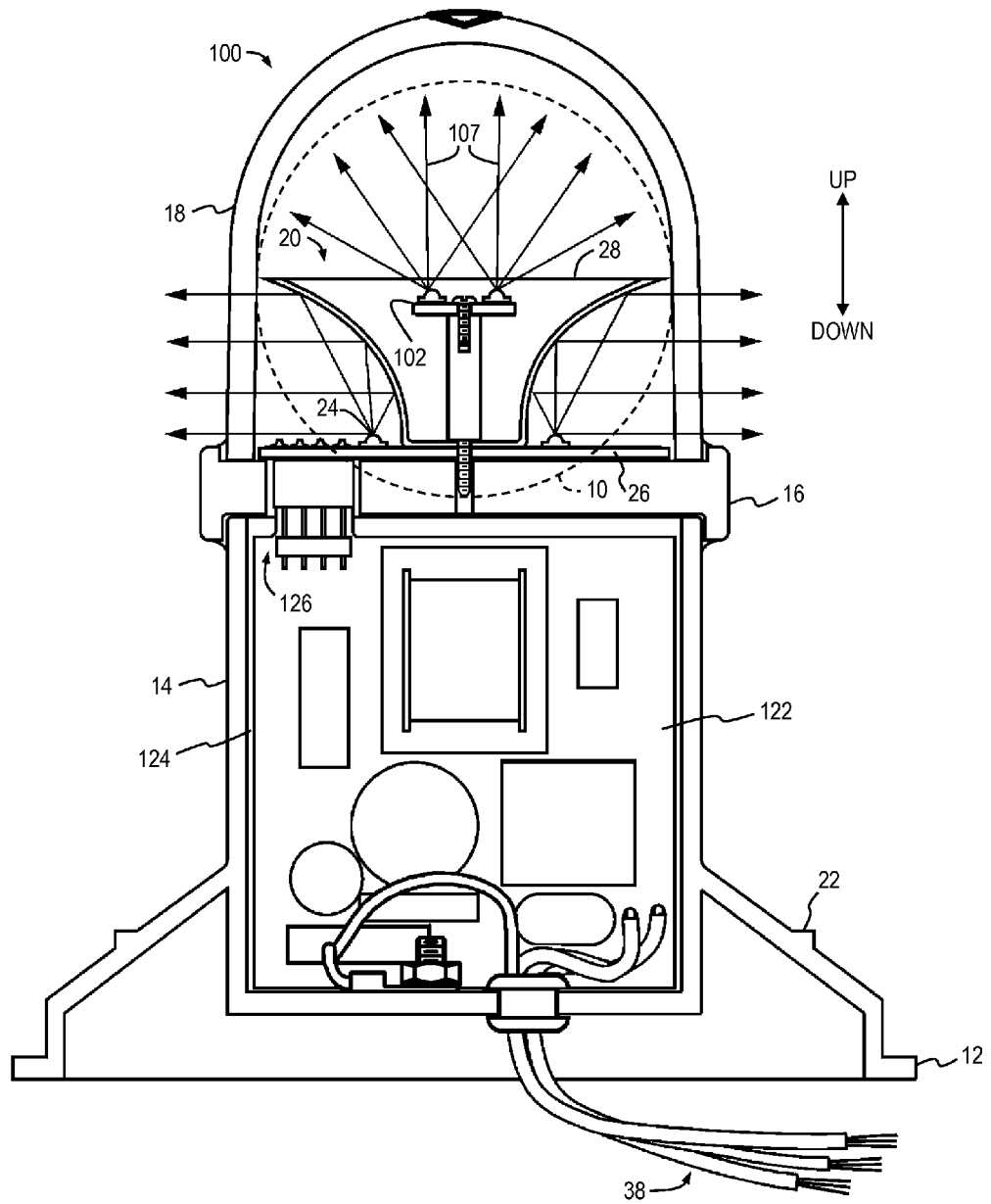
FIG. 9 is a view in section of an obstruction light according to another embodiment of the present invention.
Figure 10:
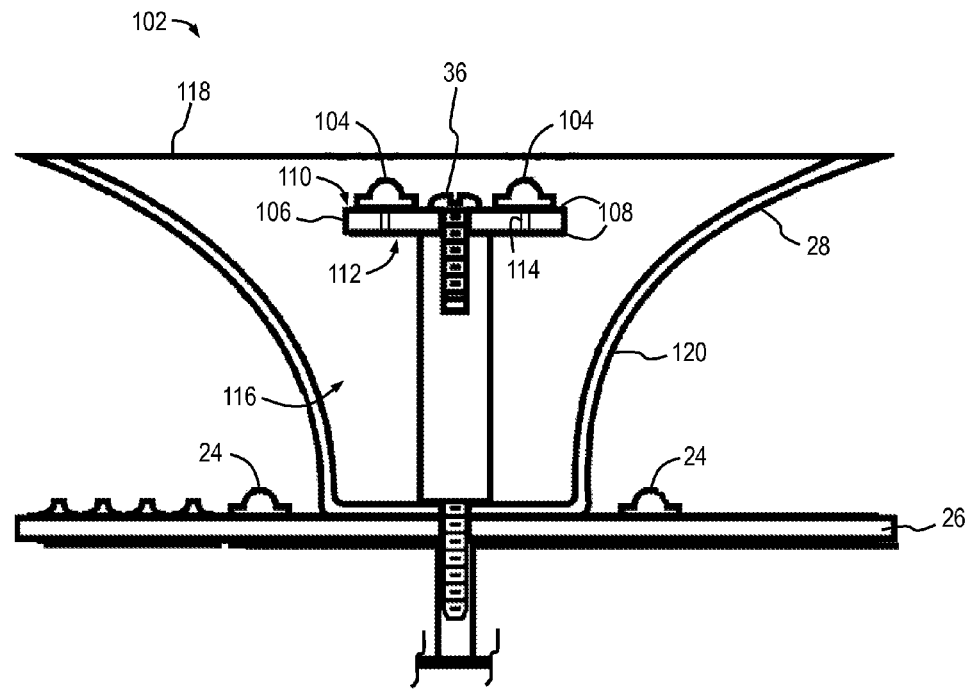
FIG. 10 is a partial expanded view of an auxiliary lighting assembly of the obstruction light of FIG. 9.

The general arrangement of an obstruction light 100 is shown in FIGS. 9 and 10 according to another embodiment of the present invention. Obstruction light 100 includes a base 12, a housing 14, a lens retainer 16, a lens 18, and a lamp assembly 20. Lamp assembly 20 further includes an auxiliary lighting assembly 102 configured to direct light upwardly from obstruction light 100.

Auxiliary lighting assembly 102 includes one or more auxiliary LEDs 104 mounted to an auxiliary printed wiring board 106. Preferably, a central light emitting axis 107 of LEDs 104 is oriented upwardly and generally perpendicularly away from the planar surface of printed wiring board 26. Stated another way, central light emitting axis 107 is oriented at about 90 degrees with respect to the planar surface of printed wiring board 26. In some embodiments of the present invention the about 90 degrees has a tolerance of plus or minus 30 degrees. Auxiliary printed wiring board 106 may include thermally-conductive elements 108, such as printed copper areas on an upper and an opposing lower surface 110, 112 respectively, and may further include thermal vias 114 extending between the upper and lower surfaces to couple heat from the upper surface to the lower surface. In some embodiments vias 114 may be located under the auxiliary LEDs 104. Auxiliary printed wiring board 106, so configured, functions as a heat spreader.

Auxiliary lighting assembly 102 is preferably coupled to reflector 28. If reflector 28 is generally hollow, auxiliary lighting assembly may be disposed within an interior portion 116 of reflector 28, below an upper lip 118 of the reflector in order to minimize light pollution in a downward direction of the obstruction light 100. If reflector 28 is generally solid, auxiliary lighting assembly may be coupled to a surface formed at upper lip 118. In one embodiment of the present invention a threaded stud portion of a standoff 120, detachably coupled to lens retainer 16 through an opening in printed wiring board 26, secures the printed wiring assembly to the lens retainer. Fastener 36 is detachably coupled to an opposing threaded receptacle of standoff 120 through an opening in auxiliary printed wiring board 106 to secure the auxiliary printed wiring assembly to lamp assembly 20. Standoff 120 and reflector 28 are thermally coupled to thermally conductive elements 108 and thermal vias 114, all of these elements acting as heat sinks for auxiliary LEDs 104.

Electrical wiring to power auxiliary lighting assembly 102 may be provided by wiring extending from auxiliary printed wiring board 106 to printed wiring board 26 through a second opening in reflector 28.

Auxiliary LEDs 104 are preferably configured to emit light upwardly from obstruction light 100. In some embodiments auxiliary LEDs 104 may differ from LEDs 24. For example, auxiliary LEDs 104 may be configured to emit infrared light to alert flight crews operating with night vision imaging systems (NVIS).

A power supply assembly 122 may also disposed within an interior portion 124 of housing 14, as shown in FIG. 9. Power supply assembly 122 may comprise one or more of the elements shown in FIGS. 7 and 8, and detailed above. In addition, a connector 126 may be utilized to detachably couple lamp assembly 20 to power supply assembly 122. Connector 126 allows for rapid and convenient re-configurability of obstruction light 100 to accommodate various types of LEDs 24, 104, AC and DC power supply voltages, and so on. Power supply 122 and connector 126 may also be used to advantage in obstruction light 10 within the scope of the present invention.

Obstruction light 100 is otherwise similar to previously-described obstruction light 10 and thus will not be detailed further.

Figure 11:
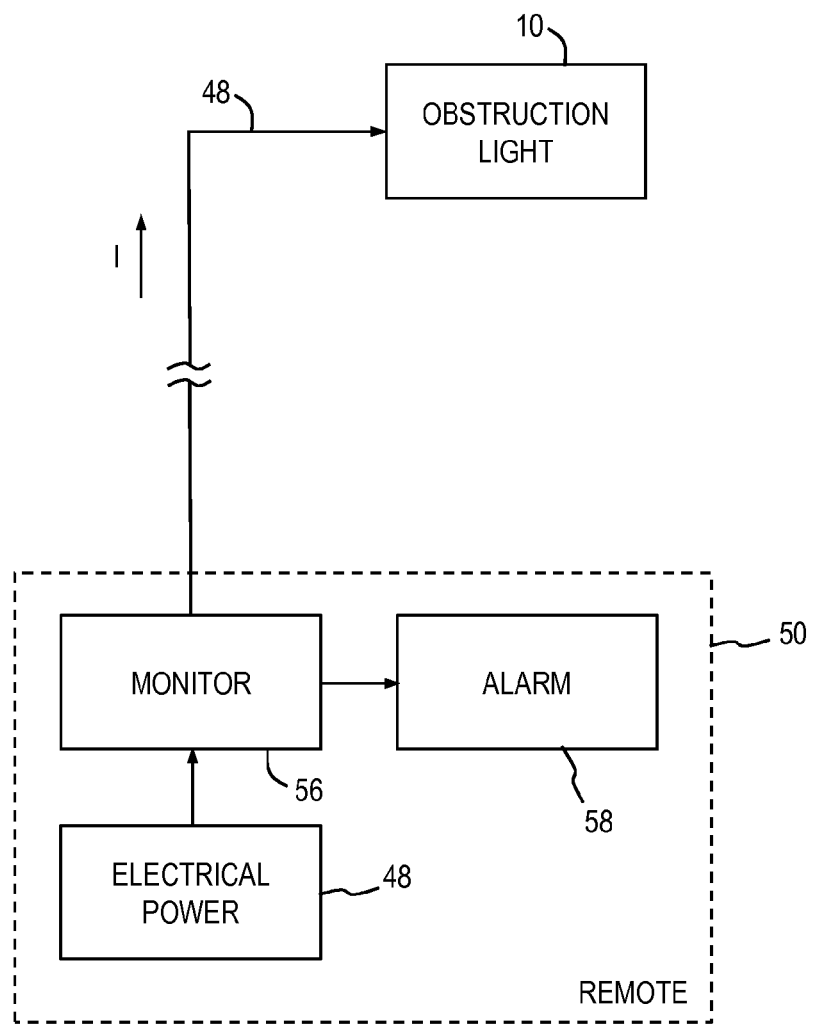
FIG. 11 is a schematic diagram showing a lighting system having a remote monitoring portion according to an embodiment of the present invention.

Referring now to FIG. 11, remote source 50 may include a monitor 56 to monitor obstruction light 10 (or obstruction light 100) for failures of LEDs 24. Preferably, monitor 56 monitors the level of current "I" supplied to obstruction light 10 for a decrease in current that signals a fault of the obstruction light. Although LEDs 24 typically require less than one-tenth the power of a standard L-810 incandescent lamp, the input current to obstruction light 10 has a haversine input current peak that is roughly 30% that of an incandescent lamp, still easily detected by remote current sensors. A decrease in power consumption of obstruction light 10 below a predetermined level may trigger monitor 48 to activate an alarm 58, such as a visual alert, an aural alert, or a radio signal such as a cellular telephone transmission to alert maintenance personnel of the fault.

While this invention has been shown and described with respect to a detailed embodiment thereof, it will be understood by those skilled in the art that changes in form and detail thereof may be made without departing from the scope of the claims of the invention.

What is claimed is:

1. An obstruction lighting system, comprising:
   a printed wiring board having a generally planar surface;
   a plurality of light emitting diodes mounted to the planar surface of the printed wiring board, a central light emitting axis of the light emitting diodes being oriented generally perpendicularly away from the planar surface;
   a reflector coupled to the printed wiring board, the reflector having a first side, a second, opposing side, and an outer surface extending between the first and second sides, the outer surface having the shape of a rotated conic section, the first side of the reflector facing toward the printed wiring board and the second side of the reflector facing away from the printed wiring board,
   the outer surface of the reflector having an optical axis generally perpendicular to the central light emitting axis of the light emitting diodes; and
   an auxiliary lighting assembly proximate the second side of the reflector, the auxiliary lighting assembly being configured with an infrared light source such that at least a portion of the infrared light emitted from the obstruction lighting system is generally perpendicular to the printed wiring board.

2. The obstruction lighting system of claim 1 wherein the light emitting diodes are surface-mounted to the printed wiring board.

3. The obstruction lighting system of claim 1 wherein the printed wiring board is configured to block light emissions from the light emitting diodes in a downwardly direction from the obstruction lighting system.

4. The obstruction lighting system of claim 1, further including a power supply configured to operate from an AC power source, the power supply having an electrical input, a first AC-to-DC converter, a DC-to-regulated AC converter, and a second AC-to-DC converter.

5. The obstruction lighting system of claim 1, further including a power supply configured to operate from a DC power source, the power supply having an electrical input, a DC-to-regulated AC converter, and an AC-to-DC converter.

6. The obstruction lighting system of claim 1 wherein the reflector further includes a generally hollow interior portion.

7. The obstruction lighting system of claim 1 wherein the reflector has a developed-shape rotated conic section.

8. The obstruction lighting system of claim 1 wherein the auxiliary lighting assembly is disposed within an interior portion of the reflector.

9. The obstruction lighting system of claim 1, the infrared light source comprising at least one infrared light emitting diode.

10. The obstruction lighting system of claim 9 wherein the auxiliary lighting assembly further includes an auxiliary printed wiring board, the auxiliary light emitting diode being mounted to the auxiliary printed wiring board.

11. The obstruction lighting system of claim 10 wherein the auxiliary printed wiring board comprises a first surface and an opposing second surface, the first and second surfaces having thermally conductive elements, the auxiliary printed wiring board further including at least one thermal via extending between the first and second surfaces and thermally coupled to the thermally conductive elements of the first and second surfaces.

12. The obstruction lighting system of claim 11 wherein the at least one thermal via is located under the auxiliary light emitting diode.

13. The obstruction lighting system of claim 11 wherein the auxiliary lighting assembly is detachably coupled to the printed wiring board with a standoff, the standoff being thermally coupled to the thermally conductive elements of the auxiliary printed wiring board.

14. An obstruction lighting system, comprising:
   a housing;
   a lens;
   a lens retainer intermediate the housing and the lens;
   a printed wiring board having a generally planar surface, the printed wiring board being immediately adjacent the lens retainer and in thermal communication therewith;
   a plurality of light emitting diodes mounted to the planar surface of the printed wiring board, a central light emitting axis of the light emitting diodes being oriented generally perpendicularly away from the planar surface;
   a reflector coupled to the printed wiring board, the reflector having a first side, a second, opposing side, and an outer surface extending between the first and second sides, the outer surface having the shape of a conic cross section, the first side of the reflector facing toward the printed wiring board and the second side of the reflector facing away from the printed wiring board;
   the outer surface of the reflector having an optical axis generally perpendicular to the central light emitting axis of the light emitting diodes; and
   an auxiliary lighting assembly proximate the second side of the reflector, the auxiliary lighting assembly being configured with an infrared light source such that at least a portion of the infrared light emitted from the obstruction lighting system is generally perpendicular to the printed wiring board.

15. The obstruction lighting system of claim 14, the infrared light source comprising at least one auxiliary infrared light emitting diode.

16. A method for providing obstruction lighting, comprising the steps of:
   obtaining a printed wiring board having a generally planar surface;
   mounting a plurality of light emitting diodes to the planar surface of the printed wiring board, a central light emitting axis of the light emitting diodes being oriented generally perpendicularly away from the planar surface;

coupling a reflector to the printed wiring board, the reflector having a first side, a second, opposing side, and an outer surface extending between the first and second sides, the outer surface having the shape of a rotated conic section, the first side of the reflector facing toward the printed wiring board and the second side of the reflector facing away from the printed wiring board, the outer surface of the reflector having an optical axis generally perpendicular to the central light emitting axis of the light emitting diodes; and mounting an auxiliary lighting assembly proximate the second side of the reflector, the auxiliary lighting assembly being configured with an infrared light source such that at least a portion of the infrared light emitted from the obstruction lighting system is generally perpendicular to the printed wiring board.

17. An obstruction lighting system, comprising:

a disc having a generally planar surface;

a plurality of light emitting diodes mounted to the planar surface of the disc, a central light emitting axis of the light emitting diodes being oriented generally perpendicularly away from the planar surface;

a reflector coupled to the disc, the reflector having a first side, a second, opposing side, and an outer surface in the shape of a rotated conic section, the outer surface of the reflector extending between the first and second sides and having an optical axis generally perpendicular to the central light emitting axis of the light emitting diodes;

the first side of the reflector facing toward the disc and the second side of the reflector facing away from the disc; and an auxiliary lighting assembly proximate the second side of the reflector, the auxiliary lighting assembly being configured with an infrared light source such that at least a portion of the infrared light emitted from the obstruction lighting system is generally perpendicular to the disc.

18. The obstruction lighting system of claim 17 wherein:

the reflector includes an interior portion; and the auxiliary lighting assembly is disposed within the interior portion of the reflector.

19. The obstruction lighting system of claim 1 wherein the printed wiring board is a disc.

20. The obstruction lighting system of claim 8, wherein:

the second side of the reflector includes a rim; and the auxiliary lighting assembly is disposed within the interior portion of the reflector, below the rim.

21. The method of claim 16 wherein the infrared light source comprises at least one infrared light emitting diode.

22. The obstruction lighting system of claim 17 wherein the infrared light source comprises at least one infrared light emitting diode.

\* \* \* \* \*

UNITED STATES PATENT AND TRADEMARK OFFICE
CERTIFICATE OF CORRECTION

PATENT NO. : 9,016,896 B1  Page 1 of 1
APPLICATION NO. : 13/403232
DATED : April 28, 2015
INVENTOR(S) : Charles A. Roudeski It is certified that error appears in the above-identified patent and that said Letters Patent is hereby corrected as shown below:

In the Claims,

Column 8, line 57, "at least one auxiliary infrared" should read --at least one infrared--.

Signed and Sealed this
Twenty-second Day of September, 2015

Michelle K. Lee
*Director of the United States Patent and Trademark Office*